(12) United States Patent
Chiproot

(10) Patent No.: US 9,927,051 B2
(45) Date of Patent: Mar. 27, 2018

(54) SEAL HOLDING DEVICE FOR PIPE CLAMP

(71) Applicant: Avi Chiproot, Kfar-Saba (IL)

(72) Inventor: Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 0 days.

(21) Appl. No.: 14/700,348

(22) Filed: Apr. 30, 2015

(65) Prior Publication Data
US 2016/0319969 A1 Nov. 3, 2016

(51) Int. Cl.
| | |
|---|---|
| *F16L 21/06* | (2006.01) |
| *F16L 17/03* | (2006.01) |
| *F16L 55/172* | (2006.01) |
| *F16L 21/00* | (2006.01) |
| *F16L 21/03* | (2006.01) |

(52) U.S. Cl.
CPC .......... *F16L 21/065* (2013.01); *F16L 17/032* (2013.01); *F16L 21/002* (2013.01); *F16L 21/03* (2013.01); *F16L 55/172* (2013.01)

(58) Field of Classification Search
CPC ....... F16L 21/065; F16L 21/022; F16L 21/08; F16L 25/14; F16L 17/04; F16L 21/002; F16L 17/032; F16L 55/172; F16L 21/03; Y10T 24/1441; Y10T 24/1412; Y10T 24/1427; Y10T 29/49947
See application file for complete search history.

(56) References Cited

U.S. PATENT DOCUMENTS

| | | | | |
|---|---|---|---|---|
| 2,377,510 A | * | 6/1945 | Newell | F16L 17/04 |
| | | | | 277/616 |
| 4,186,948 A | * | 2/1980 | Cronk | F16L 21/005 |
| | | | | 24/274 R |
| 8,047,476 B2 | * | 11/2011 | Van Walraven | F16L 3/1016 |
| | | | | 248/58 |
| 2005/0189768 A1 | * | 9/2005 | Avram | F16L 21/065 |
| | | | | 285/419 |

* cited by examiner

*Primary Examiner* — David Bryant
*Assistant Examiner* — Lee A Holly
(74) *Attorney, Agent, or Firm* — Dekel Patent Ltd.; David Klein

(57) ABSTRACT

A pipe clamp including an annular clamp housing having an opening for inserting therein a pipe, opposing clamp members located near ends of the annular clamp housing, one or more tightening elements for fastening and tightening the clamp members towards each other in a direction transverse to an axial length of the annular clamp housing, and an annular seal placed in an inner perimeter of the annular clamp housing, wherein one portion of the annular seal is attached to the annular clamp housing with one or more mechanical fasteners and another portion of the annular seal is slidingly attached to the annular clamp housing with one or more mechanical fasteners so that the annular seal is permitted to move and expand radially about as the pipe clamp is tightened by one or more tightening elements.

7 Claims, 3 Drawing Sheets

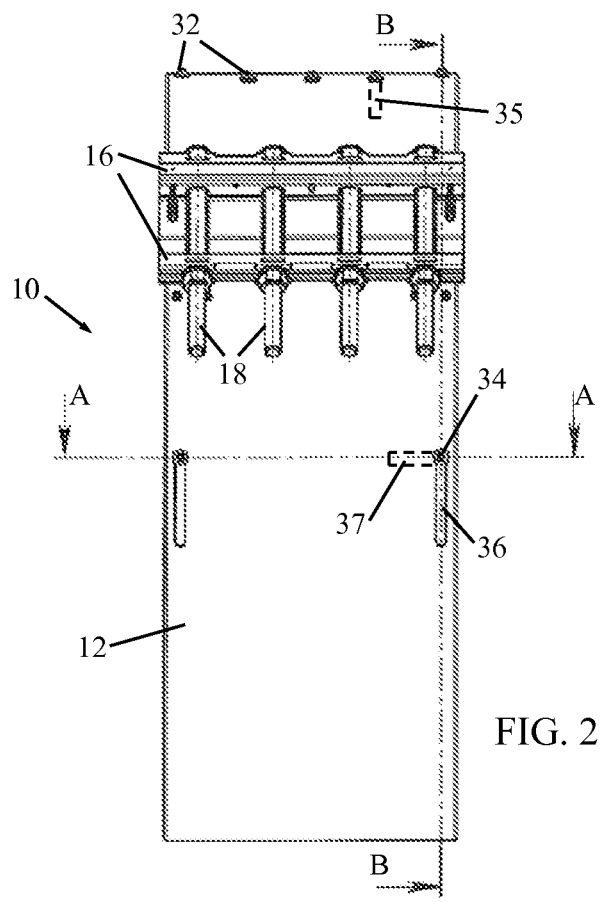
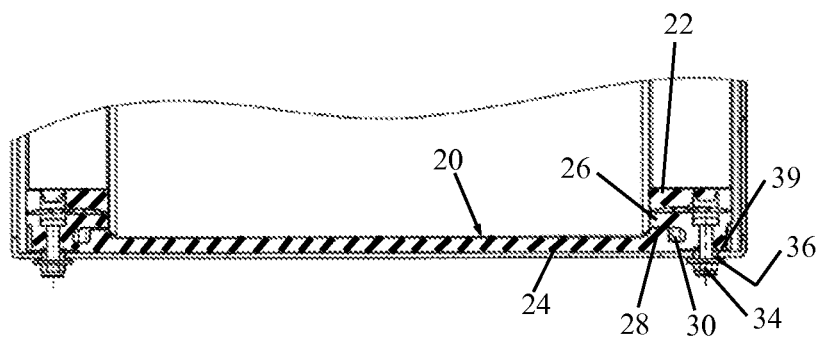
FIG. 2
FIG. 2A

SEAL HOLDING DEVICE FOR PIPE CLAMP

CROSS-REFERENCE TO OTHER APPLICATIONS

This application is a continuation of U.S. patent application Ser. No. 13/494,177, filed 12 Jun. 2012, and claims priority therefrom.

FIELD OF THE INVENTION

The present invention relates to a coupling for pipes, and particularly to a device for holding a seal to an inner perimeter of a pipe clamp before tightening the clamp.

BACKGROUND OF THE INVENTION

Many kinds of removable band-type clamps or couplings (the terms being used interchangeably throughout) for pipes exist in the art. It is noted that throughout the specification and claims, the term "pipe" encompasses any kind of generally cylindrical object.

For example, one commercially available type of pipe coupling has an annular seal clamp housing. Clamp members are positioned face to face and a tightening element is tightened to press an annular seal (annular elastomeric band) against the outside of the pipe inserted through the seal clamp housing. This type of clamp is particularly useful for pipe repair applications, such as the pipe repair clamp described in U.S. Pat. No. 6,830,268 to Krausz, the disclosure of which is incorporated herein by reference. The present invention is not limited to these pipe clamps, however.

Initially one end of the annular seal is typically secured to the annular clamp housing and the other end is left loose, unattached to the clamp housing. This is important because when the coupling is tightened against the pipe, the ends of the annular seal abut against each other. The free end of the seal allows the seal to move and expand radially about the pipe as the coupling is tightened, so that the seal always smoothly and uniformly presses against and around the pipe. If both ends of the seal were fixed to the clamp housing, the seal would be prevented from expanding uniformly radially about the pipe as the coupling is tightened. Rather the seal would bunch up, become folded or kinked, or otherwise deform, and would not smoothly and uniformly press against and around the pipe.

However, the free end of the seal can cause another problem. When initially placing the coupling about the pipe, the free end of the seal can hang loosely out of the annular seal clamp housing. It can be cumbersome for some installers to hold the free end of the seal in the housing while at the same time placing the coupling around the pipe.

SUMMARY OF THE INVENTION

The present invention seeks to provide a device for holding a seal (in particular, the free end of the seal) to an inner perimeter of a pipe clamp before tightening the clamp, as is described more in detail further below.

There is provided in accordance with an embodiment of the present invention a pipe clamp including an annular clamp housing having an opening for inserting therein a pipe, opposing clamp members located near ends of the annular clamp housing, one or more tightening elements for fastening and tightening the clamp members towards each other in a direction transverse to an axial length of the annular clamp housing, and an annular seal placed in an inner perimeter of the annular clamp housing, wherein one portion of the annular seal is attached to the annular clamp housing with one or more mechanical fasteners and another portion of the annular seal is slidingly attached to the annular clamp housing with one or more mechanical fasteners so that the annular seal is permitted to move and expand radially about as the pipe clamp is tightened by one or more tightening elements.

In accordance with an embodiment of the present invention the annular seal is slidingly attached to the annular clamp housing with the one or more mechanical fasteners passing through one or more elongate apertures formed through the annular clamp housing. The elongate apertures are elongate in a radial direction. Additionally or alternatively, the elongate apertures may be elongate in an axial direction.

In accordance with an embodiment of the present invention the one portion of the annular seal is fixedly attached to the annular clamp housing with the one or more mechanical fasteners. Alternatively, the one portion of the annular seal may be slidingly attached to the annular clamp housing with the one or more mechanical fasteners.

BRIEF DESCRIPTION OF THE DRAWINGS

The present invention will be understood and appreciated more fully from the following detailed description, taken in conjunction with the drawings in which:

FIG. 2 is a simplified side view illustration of the pipe clamp; and

FIGS. 2A and 2B are simplified sectional illustrations of the pipe clamp, taken along lines A-A and B-B, respectively, in FIG. 2.

DETAILED DESCRIPTION OF EXEMPLARY EMBODIMENTS

Figure 1A:
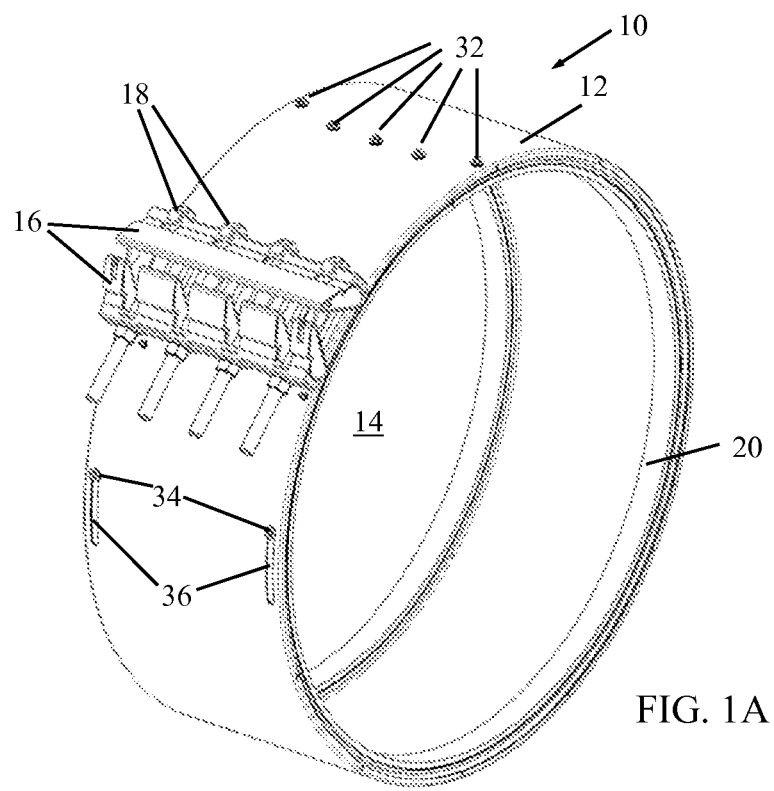
FIGS. 1A-1B are simplified pictorial illustrations of a pipe clamp, constructed and operative in accordance with a non-limiting embodiment of the present invention.
Figure 1B:
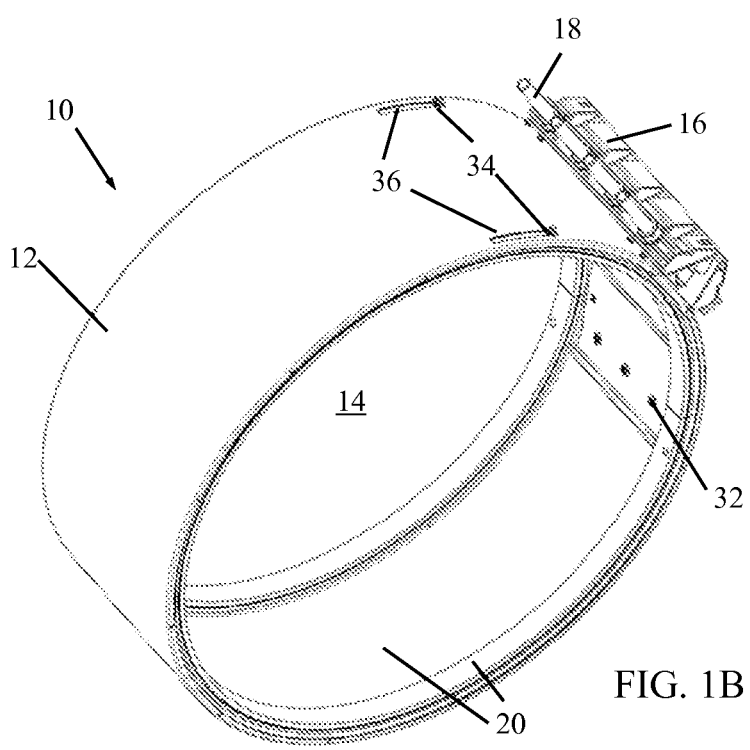

Reference is now made to FIGS. 1A-2B, which illustrate a pipe clamp 10, constructed and operative in accordance with a non-limiting embodiment of the present invention.

Pipe clamp 10 includes an annular clamp housing 12, typically made of a flexible metal sheet, such as but not limited to, stainless steel. Annular clamp housing 12 has an opening 14 for inserting therein a pipe (not shown). The ends of annular clamp housing 12 are provided with two (wedge-shaped) opposing clamp members 16. One or more tightening elements 18 (e.g., one or more mechanical fasteners, such as a bolt or screw and a tightening nut, and possibly washer) fasten and tighten clamp members 16 towards each other in a direction transverse to the axial length of annular clamp housing 12 so as to apply a radially-inward clamping force on the pipe inserted in opening 14.

An annular seal 20, fashioned as a flexible inner sleeve, is placed in the inner perimeter of annular clamp housing 12. Seal 20, without limitation, may be made of a rubber (e.g., EPDM (ethylene propylene diene monomer), butyl, styrene butadiene or neoprene) or a thermoplastic elastomer (e.g., polyurethane or olefin) compatible with the fluid to be carried in the pipe.

In one embodiment, annular seal 20 is one layer of an elastomer. Alternatively, as shown in the illustrated embodiment of FIG. 2A, annular seal 20 includes inner and outer sealing rings 22 and 24 radially spaced from one another.

The outer sealing ring 24 includes a folded portion 26 folded over an annular abutment 28 so as to define an inner space 30, which can be in fluid communication with a fluid (not shown) flowing in the pipe. The fluid enters inner space 30 and applies pressure therein to increase tightening of the seal. The inner sealing ring 22 may be removed from or added to the outer sealing ring 24 to accommodate different pipe diameters. A type of this seal is described in U.S. Pat. No. 6,293,556 to Krausz, the disclosure of which is incorporated herein by reference; however, the invention is not limited to this type of seal.

One end or portion of seal 20 is fixedly attached to annular clamp housing 12 with one or more mechanical fasteners 32, such as a bolt or screw and a tightening nut, which pass through a circular hole in housing 12. In accordance with an embodiment of the present invention, another portion (e.g., the opposite end) of seal 20 is slidingly attached to annular clamp housing 12 with one or more mechanical fasteners 34, such as a bolt or screw and a tightening nut and washer. This may be accomplished by mechanical fasteners 34 passing through one or more elongate apertures 36 formed through annular clamp housing 12. The apertures 36 are elongate in the radial direction. Alternatively, the mechanical fastener 34 can be fashioned with a sliding portion that permits the fastener along with seal 20 to slide radially.

Figure 2B:
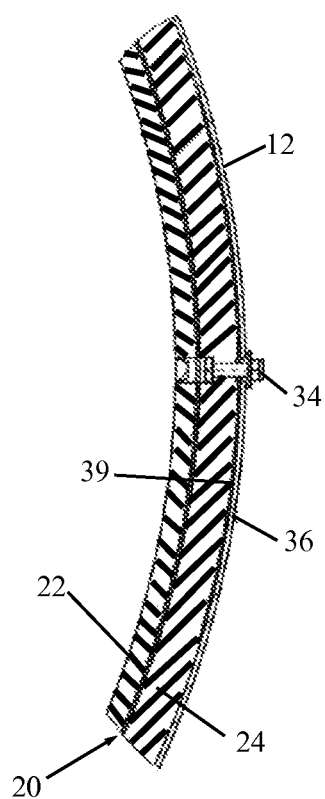

In order to prevent the elastomeric material of seal 20 from oozing out of aperture 36 during tightening, a blocking element 39, such as a plate or other small piece of metal sheet (e.g., stainless steel), may be placed on the inner side of housing 12 behind aperture 36, as seen in FIGS. 2A and 2B.

When pipe clamp 10 is tightened against the pipe, the ends of annular seal 20 abut against each other. Because one end of seal 20 is attached by mechanical fasteners 34 in elongate apertures 36, seal 20 is permitted to move and expand radially about the pipe as pipe clamp 10 is tightened. This ensures that seal 20 always smoothly and uniformly presses against and around the pipe. In addition, when initially placing pipe clamp 10 about the pipe, no portion of seal 20 will hang loosely out of clamp housing 12 because seal 20 is held by fasteners 32 and 34. This makes placement of pipe clamp 10 around the pipe easy and fast.

Alternatively, mechanical fasteners 32 may also pass through elongate apertures, oriented in any direction, as indicated by broken lines 35 in FIG. 2.

Alternatively or additionally, elongate apertures 36 may be elongate in the axial direction, as indicated by broken lines 37 in FIG. 2. This allows seal 20 to expand axially, which may be important in certain applications in which axial forces tend to make the seal expand axially.

The scope of the present invention includes both combinations and subcombinations of the features described hereinabove as well as modifications and variations thereof which would occur to a person of skill in the art upon reading the foregoing description and which are not in the prior art.

What is claimed is:

1. A method comprising:
   placing a pipe clamp around a portion of a pipe, wherein said pipe clamp comprises:
   an annular clamp housing having an opening for inserting therein a pipe;
   opposing clamp members located near ends of said annular clamp housing;
   one or more tightening elements for fastening and tightening said clamp members towards each other in a direction transverse to an axial length of said annular clamp housing; and
   an annular seal placed in an inner perimeter of said annular clamp housing;
   wherein one portion of said annular seal is attached to said annular clamp housing with one or more mechanical fasteners and another portion of said annular seal is slidingly attached to said annular clamp housing with one or more mechanical fasteners so that said annular seal is permitted to move and expand radially about as said pipe clamp is tightened by one or more tightening elements, and wherein said annular seal is slidingly attached to said annular clamp housing with said one or more mechanical fasteners passing through one or more elongate oval apertures formed through said annular clamp housing, said elongate oval apertures being elongate in an axial direction;
   wherein the pipe clamp is placed around the portion of the pipe so that initially ends of said annular seal abut against each other; and
   tightening the pipe clamp to cause said seal to move and expand radially about the pipe as the pipe clamp is tightened, such that the seal always smoothly and uniformly presses against and around the pipe.

2. The method according to claim 1, wherein when initially placing the pipe clamp about the pipe, no portion of the seal hangs loosely out of said annular clamp housing.

3. The method according to claim 1, wherein said annular clamp housing is also provided with other elongate apertures which are elongate in a radial direction.

4. The method according to claim 1, wherein said one portion of said annular seal is fixedly attached to said annular clamp housing with said one or more mechanical fasteners.

5. The method according to claim 1, wherein said one portion of said annular seal is slidingly attached to said annular clamp housing with said one or more mechanical fasteners.

6. The method according to claim 1, wherein said annular seal comprises one layer.

7. The method according to claim 1, wherein said annular seal comprises more than one layer.

\* \* \* \* \*